P. Eidmann.
Corn-Planter.

№ 74326. Patented Feb. 11, 1868

Witnesses.
Cornelius Coy
A. N. Marr

Inventor:
Philip Eidmann
per
Alexander D Mason

United States Patent Office.

PHILIP EIDMANN, OF PEKIN, ILLINOIS.

Letters Patent No. 74,326, dated February 11, 1868.

IMPROVEMENT IN CORN-PLANTERS.

*The Schedule referred to in these Letters Patent and making part of the same.*

TO ALL WHOM IT MAY CONCERN:

Be it known that I, PHILIP EIDMANN, of Pekin, in the county of Tazewell, and in the State of Illinois, have invented certain new and useful Improvements in Corn-Planters; and do hereby declare that the following is a full, clear, and exact description thereof, reference being had to the accompanying drawings, and to the letters of reference marked thereon.

Figure 1:
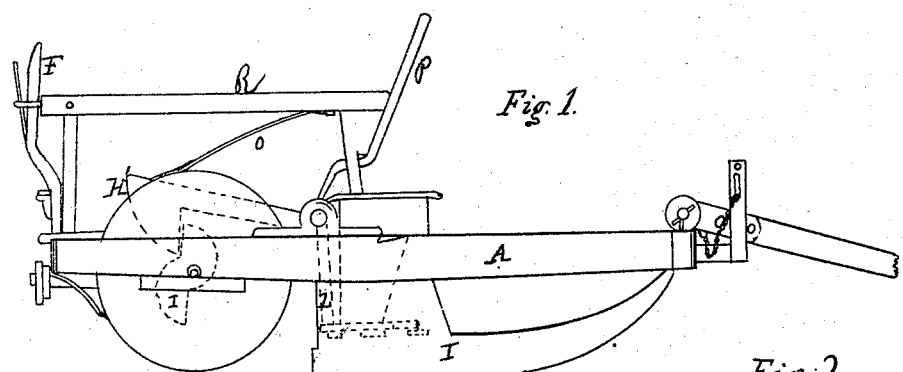
Figure 2:
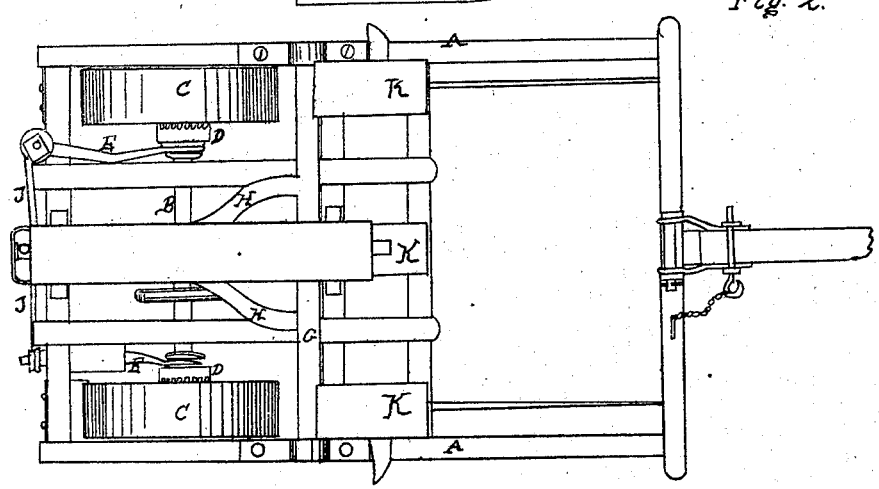
Figure 3:
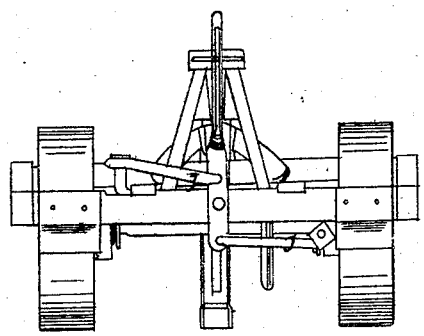

In the annexed drawings, making part of this specification, A represents the frame of the machine, which is supported at its rear end by the usual wheels and axle, and at its forward end by means of the runners I. To the inner face of each wheel is secured a gear-wheel, through the centre of which passes the axle B. The axle B is provided with two clutch-wheels, D D. These clutch-wheels are provided with teeth, to correspond with the teeth of the gear-wheels in the wheels C C, and when they catch, the axle B is stationed to the wheels C C, and revolves with them. When the clutch-wheels are out of gear, the axle B is stationary. The clutches are operated by means of the levers E E, rods J J, and lever F. There are three runners supporting the forward end of the machine, and over each one is a seed-box, K K, which is provided at its bottom with any of the known and usual seed-slides for discharging grain. The seed-slides of these hoppers are connected to a shaft, G, which lies across the frame A, by means of the arms L, seen in red lines, fig. 1. The shaft G is made to oscillate, to give motion to these arms and slides. In order to effect this, I secure a block, H', between the outer ends of two arms, H H, which extend out from shaft G, and then operate this block by means of the cams I I, upon the shaft B. A spring, O, presses the block H' down, while the cams I I elevate it, thus giving an oscillating motion to the shaft G, and a reciprocating motion to the seed-slides. When the lever F throws the clutch-wheels out of gear, the shaft B ceases to revolve, and the cams I consequently cease to operate the seed-slides. The arm for operating the slide of the centre seed-hopper is adjustable, and can be thrown in and out of gear with shaft G, by means of lever P, and thus seed can be discharged or not, from this hopper, at pleasure. The operator sits upon the seat R, and drives and governs the seeding of the machines.

Having thus fully described my invention, what I claim as new, and desire to secure by Letters Patent, is—

The arrangement of shaft B, clutches D D, and cams I I, with the levers for operating the clutches, with the shaft G, arms H H, block H', and arms L L, which operate the seed-slides, as and for the purpose set forth.

In testimony that I claim the foregoing, I have hereunto set my hand, this 30th day of September, 1867.

PHILIP EIDMANN.

Witnesses:
HENRY LAUTZ,
PH. NICKEL.